(12) United States Patent
Asakawa

(10) Patent No.: US 7,326,349 B2
(45) Date of Patent: Feb. 5, 2008

(54) METHOD AND APPARATUS FOR PURIFYING ALCOHOLIC LIQUORS

(75) Inventor: Yuji Asakawa, Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 10/573,906

(22) PCT Filed: Sep. 16, 2004

(86) PCT No.: PCT/JP2004/013506

§ 371 (c)(1),
(2), (4) Date: Mar. 29, 2006

(87) PCT Pub. No.: WO2005/030921

PCT Pub. Date: Apr. 7, 2005

(65) Prior Publication Data

US 2006/0292262 A1    Dec. 28, 2006

(30) Foreign Application Priority Data

Sep. 29, 2003   (JP) .............................. 2003-338505

(51) Int. Cl.
*C02F 3/00* (2006.01)
(52) U.S. Cl. .................. 210/664; 210/669; 210/686; 210/690; 210/691; 210/264

(58) Field of Classification Search ................ 210/664, 210/669, 686, 690, 691, 264
See application file for complete search history.

(56) References Cited

FOREIGN PATENT DOCUMENTS

JP       36-12194      7/1961
WO    WO-02/04593     1/2002

OTHER PUBLICATIONS

International Search Report for PCT/JP2004/013506 dated Dec. 14, 2004 (1 page).
Excerpts from Japanese Patent Publication No. Sho 36-12194 dated Jul. 31, 1961 (2 pages).

*Primary Examiner*—Chester T. Barry
(74) *Attorney, Agent, or Firm*—Osha• Liang LLP

(57) ABSTRACT

After passing alcoholic liquors 20 through an $HSO_3$ type strongly basic anion exchange resin layer 14, or after adding an $HSO_3$ salt to alcoholic liquors; the alcoholic liquors are passed through a mixed bed layer 18 containing of an H type strongly acidic cation exchange resin and a free base type weakly basic anion exchange resin, or the alcoholic liquors are successively passed through an H type strongly acidic cation exchange resin layer and a free base type weakly basic anion exchange resin layer. According to this way, it is possible to remove aldehydes and inorganic salts from alcoholic liquors such as brewed alcoholic liquors and distilled alcoholic liquors, while strongly retaining a peculiar fragrance or retaining a manneristic flavor.

4 Claims, 1 Drawing Sheet

METHOD AND APPARATUS FOR PURIFYING ALCOHOLIC LIQUORS

TECHNICAL FIELD

The present invention relates to a method and an apparatus for purifying alcoholic liquors such as brewed alcoholic liquors and distilled alcoholic liquors as prepared starting from grains. In particular, the invention relates to a method and an apparatus for purifying distilled alcoholic liquors starting from grains.

BACKGROUND ART

In alcoholic liquors, fragrance components, flavor components, dye components, mineral components, aldehydes, inorganic salts, and the like are contained in addition to an alcohol as the major component. Of these, aldehydes and inorganic salts are preferably removed by purification. There have hitherto been known purification apparatus of shochu (Japanese spirits) using an ion exchange resin as a purification apparatus for removing aldehydes and inorganic salts from the alcoholic liquors. In particular, there is widely used a purification apparatus of shochu composed of an aldehyde removal device using an $HSO_3$ type strongly basic anion exchange resin and a desalting device which is provided in the subsequent stage to the subject aldehyde removal device and which uses a mixed bed containing of an H type strongly acidic cation exchange resin and an OH type strongly basic anion exchange resin (for example, see JP36-12194B). According to this purification apparatus of shochu, it is possible to obtain shochu having a light flavor upon removal of a hot taste, an astringent taste and a bitter taste while slightly retaining a fragrance.

DISCLOSURE OF THE INVENTION

Recently, as various kinds of real shochu have appeared on the market, the number of a person who likes real shochu having a characteristic fragrance or flavor has increased. However, since the purification apparatus of shochu as described in the above-mentioned JP36-12194B has high performance of removing a fragrance component and a flavor component, it was not substantially used for the purification of shochu which strongly retains a fragrance or retains a manneristic flavor. This is because in the case of using a desalting device using a mixed bed containing of an H type strongly acidic cation exchange resin and an OH type strongly basic anion exchange resin, the majority of esters which are the fragrance component, such as ethyl acetate, and organic acids which are a kind of components for determining the flavor are removed at the time of removing inorganic salts.

For that reason, in the case of obtaining shochu which strongly retains a fragrance or retains a manneristic flavor by using the conventional apparatus as described in JP36-12194B, for the purpose of lowering the removal performance of esters and organic acids, the contact time of alcoholic liquors with the ion exchange resin layers of the aldehyde removal device and the desalting device was shortened, or alcoholic liquors which had been subjected to the aldehyde removal treatment and the desalting treatment were mixed with stock liquids which had not been subjected to these treatments. However, in these methods, there was the case where the removal of aldehydes or inorganic salts is insufficient.

The invention relates to a method and a purification apparatus for purifying alcoholic liquors which are capable of effectively removing aldehydes and inorganic salts from alcoholic liquors such as brewed alcoholic liquors and distilled alcoholic liquors, while strongly retaining a peculiar fragrance or retaining a manneristic flavor.

The invention is concerned with a method for purifying alcoholic liquors, in which after passing alcoholic liquors through an $HSO_3$ type strongly basic anion exchange resin layer, or after adding an $HSO_3$ salt to alcoholic liquors; the alcoholic liquors are passed through a mixed bed layer containing of an H type strongly acidic cation exchange resin and a free base type weakly basic anion exchange resin, or the alcoholic liquors are successively passed through an H type strongly acidic cation exchange resin layer and a free base type weakly basic anion exchange resin layer.

Also, the invention is concerned with a purification apparatus of alcoholic liquors, comprising an ion exchange device for passing alcoholic liquors through an $HSO_3$ type strongly basic anion exchange resin layer, or an $HSO_3$ salt addition device for adding an $HSO_3$ salt to alcoholic liquors; and an ion exchange device for passing the alcoholic liquors through a mixed bed layer containing of an H type strongly acidic cation exchange resin and a free base type weakly basic anion exchange resin, or an ion exchange device for successively passing the alcoholic liquors through an H type strongly acidic cation exchange resin layer and a free base type weakly basic anion exchange resin layer, in this order.

According to the invention, it is possible to remove aldehydes and inorganic salts from the stock liquids of alcoholic liquors while strongly retaining a fragrance of the stock liquids of alcoholic liquor or retaining a peculiar and manneristic flavor.

BRIEF DESCRIPTION OF THE DRAWING

FIG. 1 is a flow chart to show one example of the purification apparatus of alcoholic liquors according to an embodiment of the invention.

BEST MODES FOR CARRYING OUT THE INVENTION

Figure 1:
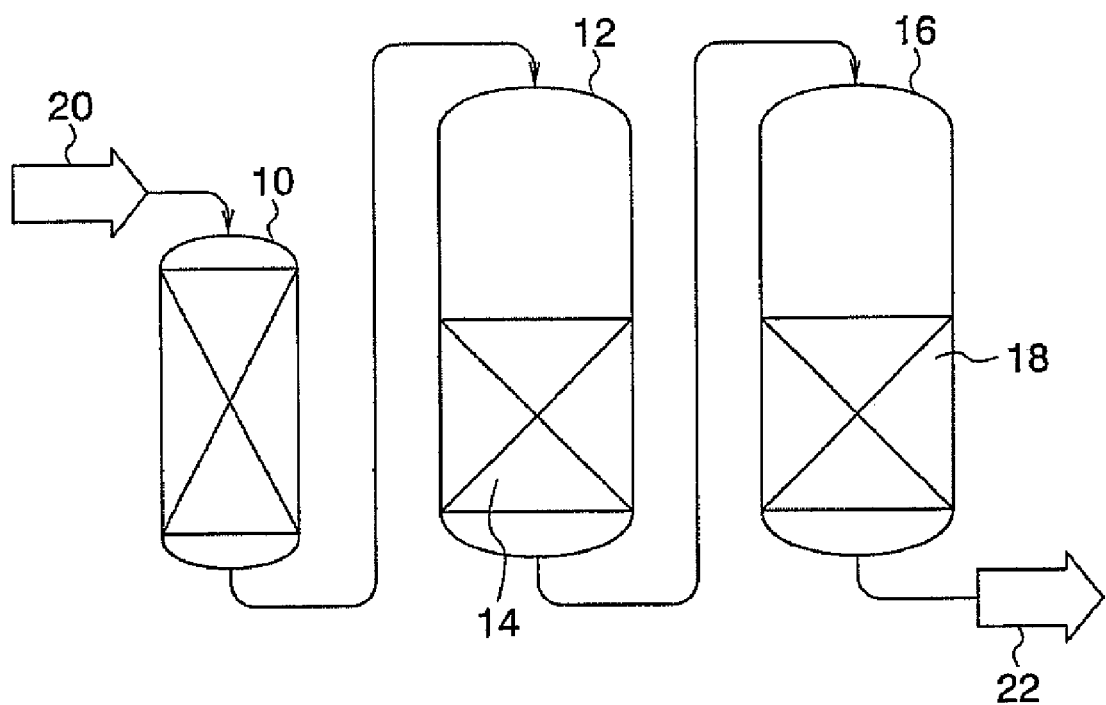
[FIG. 1]

An embodiment of the invention will be hereunder described.

In a method for purifying alcoholic liquors according to the present embodiment, after passing alcoholic liquors through an $HSO_3$ type strongly basic anion exchange resin layer, the alcoholic liquors are passed through a mixed bed layer containing of an H type strongly acidic cation exchange resin and a free base type weakly basic anion exchange resin.

Also, in a method for purifying alcoholic liquors according to the present embodiment, after passing alcoholic liquors through an $HSO_3$ type strongly basic anion exchange resin layer, the alcoholic liquors are successively passed through an H type strongly acidic cation exchange resin layer and a free base type weakly basic anion exchange resin layer.

Also, in a method for purifying alcoholic liquors according to the present embodiment, after adding an $HSO_3$ salt to alcoholic liquors, the alcoholic liquors are passed through a mixed bed layer containing of an H type strongly acidic cation exchange resin and a free base type weakly basic anion exchange resin.

Also, in a method for purifying alcoholic liquors according to the present embodiment, after adding an $HSO_3$ salt to alcoholic liquors, the alcoholic liquors are successively passed through an H type strongly acidic cation exchange resin layer and a free base type weakly basic anion exchange resin layer.

Also, in the method for purifying alcoholic liquors, it is preferable that the alcoholic liquors are distilled alcoholic liquors.

Also, in a purification apparatus of alcoholic liquors according to the present embodiment, the purification apparatus is provided with an ion exchange device for passing alcoholic liquors through an $HSO_3$ type strongly basic anion exchange resin layer and an ion exchange device for passing the alcoholic liquors through a mixed bed layer containing of an H type strongly acidic cation exchange resin and a free base type weakly basic anion exchange resin in this order.

Also, in a purification apparatus of alcoholic liquors according to the present embodiment, the purification apparatus is provided with an ion exchange device for passing alcoholic liquors through an $HSO_3$ type strongly basic anion exchange resin layer and an ion exchange device for successively passing the alcoholic liquors through an H type strongly acidic cation exchange resin layer and a free base type weakly basic anion exchange resin layer in this order.

Also, in a purification apparatus of alcoholic liquors according to the present embodiment, the purification apparatus is provided with an $HSO_3$ salt addition device for adding an $HSO_3$ salt to alcoholic liquors and an ion exchange device for passing the alcoholic liquors through a mixed bed layer containing of an H type strongly acidic cation exchange resin and a free base type weakly basic anion exchange resin in this order.

Also, in a purification apparatus of alcoholic liquors according to the present embodiment, the purification apparatus is provided with an $HSO_3$ salt addition device for adding an $HSO_3$ salt to alcoholic liquors and an ion exchange device for successively passing the alcoholic liquors through an H type strongly acidic cation exchange resin layer and a free base type weakly basic anion exchange resin layer in this order.

Also, in the purification apparatus of alcohol liquors, it is preferable that the alcoholic liquors are distilled alcoholic liquors.

In the present embodiment, as the anion exchange resin for desalting in the subsequent stage, a free base type weakly basic anion exchange resin is used in place of the conventional OH type strongly basic anion exchange resin. According to this way, in the present embodiment, the amount of retention of a fragrance component and a flavor component in the alcoholic liquors after the purification can be increased as compared with the conventional art, whereby it becomes possible to effectively remove aldehydes and inorganic salts while retaining individuality of the alcoholic liquors as much as possible.

That is, in the present embodiment, it is thought that by changing the anion exchange resin for desalting from a strongly basic anion exchange resin to a weakly basic anion exchange resin, the rate of decomposition or removal of esters as the fragrance component is lowered so that the fragrance strongly remains in the treated liquids. Similarly, it is thought that by lowering the basicity of the anion exchange resin, the rate of removal of the flavor component such as organic acids is suppressed so that the manneristic flavor remains. However, since the fragrance and flavor are affected by the incorporation of trace components or the presence or absence of a masking component, this thought is pure speculation.

The present embodiment will be hereunder described in more detail. In the present embodiment, in the aldehyde removal step as the preceding stage, alcoholic liquors are passed through an $HSO_3$ type (sulfurous acid type) strongly basic anion exchange resin layer, or an $HSO_3$ salt such as $NaHSO_3$ is added to alcoholic liquors. In this case, as compared with the addition of an $HSO_3$ salt to the alcoholic liquors, passing of the alcoholic liquors through an $HSO_3$ type strongly basic anion exchange resin layer is more preferable in view of the matter that an ion load in the desalting step as the subsequent stage is low. There is no particular limitation regarding the kind of the $HSO_3$ type strongly basic anion exchange resin. For example, materials resulting from conversion of AMBERLITE (a registered trademark, hereinafter the same) IRA400, IRA402, IRA404, IRA900 and IRA904, DIAION (a registered trademark, hereinafter the same) SA10A, SA20A, PA308, and PA408, and the like into an $HSO_3$ type can be used.

In the present embodiment, in the desalt step as the subsequent stage, alcoholic liquors are passed through a mixed bed layer containing of an H type strongly acidic cation exchange resin and a free base type weakly basic anion exchange resin, or alcoholic liquors are successively passed through an H type strongly acidic cation exchange resin layer and a free base type weakly basic anion exchange resin layer. In this case, as compared with successive passing of the alcoholic liquors through the both resin layers, the passing of the alcoholic liquors through a mixed bed layer of the both resins is more preferable in view of the matter that the rate of removal of salts is stable. There is no particular limitation regarding the kind of the H type strongly acidic cation exchange resin. For example, AMBERLITE IRA120B, IRA124, 200CT and 252, DIAION SK1B, SK112, PK212 and RP216, and the like can be used.

Furthermore, as the free base type weakly basic anion exchange resin, styrene based or acrylic free base type weakly basic anion exchange resins can be suitably used. In this case, when styrene based resins are used, the treated liquids whose fragrance is thin and whose feel on the tongue is closed to the stock liquids are obtained, whereas when acrylic resins are used, treated liquids whose fragrance is closed to the stock liquids and whose feel on the tongue is free from a stimulus. Thus, the ion exchange range may be chosen depending upon the purpose of purification. There is no particular limitation regarding the kind of the free base type weakly basic anion exchange resin. For example, AMBERLITE IRA96SB (styrene based) and IRA67 (acrylic), DIAION WA10 (acrylic) and WA20A (styrene based), and the like can be used.

In the desalting step as the subsequent stage, it is suitable that a volume ratio of the H type strongly acidic cation exchange resin to the free base type weakly basic anion exchange resin is from about 1/1 to 1/4 (provided that the volume ratio is a ratio in which the strongly acidic cation exchange resin is based on the Na type, and the weakly basic anion exchange resin is based on the free base type). Furthermore, in the case of successively passing alcoholic liquors through an H type strongly acidic cation exchange resin layer and a free base type weakly basic anion exchange resin layer, the alcoholic liquors may be successively passed through two ion exchange devices each having the respective resin or may be passed through one ion exchange device containing therein the both resin layers as separated from each other.

In the present embodiment, it is desired that the liquid-passing temperature at which the alcoholic liquors are passed through the respective ion exchange resin layer (an HSO$_3$ type strongly basic anion exchange resin layer; a mixed bed layer containing of an H type strongly acidic cation exchange resin and a free base type weakly basic anion exchange resin; or an H type strongly acidic cation exchange resin layer and a free base type weakly basic anion exchange resin layer, hereinafter the same) is in the range of from −10 to 40° C. Depending upon the alcohol concentration, there may be the case where when the liquid-passing temperature is lower than −10° C., since the liquids are frozen or the viscosity of the liquid increases, it becomes impossible to efficiently achieve the contact of the alcoholic liquors with the resin so that the removal performance of aldehydes or inorganic salts is lowered. When the liquid-passing temperature exceeds 40° C., there may be the case where evaporation or modification of the fragrance component occurs, and therefore, such is not preferable.

Furthermore, in the present embodiment, it is preferable that the liquid-passing rate at which the alcoholic liquors are passed through the respective ion exchange resin layer is in the range of from 0.1 to 50 in terms of SV based on the whole resin amount. When the liquid-passing rate is less than 0.1 in terms of SV, there may be the case where the amount of the treated liquids per unit time becomes low. When the liquid-passing rate exceeds 50 in terms of SV, there may be the case where it becomes impossible to efficiently achieve the contact of the alcoholic liquors with the resin so that the removal performance of aldehydes or inorganic salts is lowered.

According to the present embodiment, though aldehydes and inorganic salts are mainly removed from the stock liquids, amino acids are further removed. Accordingly, the present embodiment is suitable for the purification of distilled alcoholic liquors rather than brewed alcoholic liquors containing a large amount of amino acids. However, in recent years, alcoholic liquors resulting from brewing of a grain raw material which has been purified to such extent that it does not substantially contain a nitrogen component, such as ginjo sake (high-quality sake), have become available. In these cases, it is thought that even when the purification according to the present embodiment is carried out, there is no problem depending upon the flavor as required. Incidentally, examples of grain raw materials of the alcoholic liquors include barley, sweet potato, rice, sake lees, soba, unrefined sugar, sesame seed, Japanese chestnut, kaoliang, and the like.

FIG. 1 is a flow chart to show one example of the purification apparatus of alcoholic liquors according to the present embodiment. In FIG. 1, 10 stands for a filter; 12 stands for an ion exchange device (aldehyde removal device) provided with a single bed layer 14 of an HSO$_3$ type strongly basic anion exchange resin; and 16 stands for an ion exchange device (desalting device) provided with a mixed bed layer 18 containing of an H type strongly acidic cation exchange resin and a free base type weakly basic anion exchange resin. The purification apparatus of the present example is to obtain treated liquids 22 from which aldehydes and inorganic salts have been removed by successively passing the stock liquids 20 of alcoholic liquors through, the filter 10, the aldehyde removal device 12 and the desalting device 16.

In the light of the above, according to the present embodiment, it is possible to remove aldehydes and inorganic salts from the stock liquids of alcoholic liquors while strongly retaining a fragrance of the stock liquids of alcoholic liquors or retaining a peculiar and manneristic flavor.

The invention will be hereunder described in more detail with reference to the following Examples. However, it should be construed that the invention is not limited by these Examples whatever.

EXAMPLES

Example 1

After passing stock liquids of awamori (rice brandy) produced in Okinawa, which are shochu distilled from rice, through 60 mL of an HSO$_3$ type strongly basic anion exchange resin layer (prepared by converting AMBERLITE IRA404 into an HSO$_3$ type bypassing an NaHSO$_3$ solution therethrough), 1,500 mL of the stock liquids were passed through a mixed bed layer containing of 20 mL of an H type strongly acidic cation exchange resin (AMBERLITE IR120B) and 40 mL of a free base type styrene based weakly basic anion exchange resin (AMBERLITE IRA96SB) at a liquid-passing temperature of 20° C. and at a liquid-passing rate 300 mL/hr (SV=7.5 based on the anion exchange resin of the desalting column). The results of analysis and organoleptic evaluation of the stock liquids and the treated liquids are shown in Table 1. Incidentally, in the organoleptic evaluation, the fragrance and feel on the tongue were evaluated by an organoleptic test by six panels.

Example 2

The stock liquids of awamori were treated under the same conditions as in Example 1, except for using 40 mL of a free base type acrylic weakly basic anion exchange resin (AMBERLITE IRA67) in place of 40 mL of the free base type styrene based weakly basic anion exchange resin (AMBERLITE IRA96SB). The results of analysis and organoleptic evaluation of the treated liquids are shown in Table 1.

Comparative Example 1

The stock liquids of awamori were treated under the same conditions as in Example 1, except for using 40 mL of an OH type styrene based strongly basic anion exchange resin (AMBERLITE IRA402BL) in place of 40 mL of the free base type styrene based weakly basic anion exchange resin (AMBERLITE IRA96SB). The results of analysis and organoleptic evaluation of the treated liquids are shown in Table 1.

TABLE 1

| | Stock liquids of awamori | Example 1 | Example 2 | Comparative Example 1 |
| --- | --- | --- | --- | --- |
| Alcohol concentration (%) | 30 | 30 | 30 | 30 |
| pH | 7.3 | 6.15 | 6.20 | 6.34 |
| Electrical conductivity (μs/cm) | 71.3 | 0.4 | 0.4 | 0.4 |

TABLE 1-continued

|  | Stock liquids of awamori | Example 1 | Example 2 | Comparative Example 1 |
|---|---|---|---|---|
| Aldehyde concentration (mg/L) | 22 | <1 | <1 | <1 |
| Ethyl acetate concentration (mg/L) | 110 | 80 | 110 | <30 |
| Fragrance | Fragrance like fruits | Thin fragrance | Fragrance like fruits | Odorless |
| Feel on the tongue | Stimulant | Stimulant | Non-stimulant | Non-stimulant |

(Note)
With respect to the fragrance and feel on the tongue, the organoleptic evaluation by six panels was carried out.

Example 3

Stock liquids of imo-shochu produced in Kagoshima, which are spirits distilled from sweet potatoes, were treated under the same conditions as in Example 1, except for using the stock liquids of imo-shochu produced in Kagoshima in place of the stock liquids of awamori produced in Okinawa, which are shochu distilled from rice. The results of analysis and organoleptic evaluation of the stock liquids and the treated liquids are shown in Table 2.

Example 4

The stock liquids of imo-shochu produced in Kagoshima were treated under the same conditions as in Example 3, except for using 40 mL of a free base type acrylic weakly basic anion exchange resin (AMBERLITE IRA67) in place of 40 mL of the free base type styrene based weakly basic anion exchange resin (AMBERLITE IRA96SB). The results of analysis and organoleptic evaluation of the treated liquids are shown in Table 2.

Comparative Example 2

The stock liquids of imo-shochu produced in Kagoshima were treated under the same conditions as in Example 3, except for using 40 mL of an OH type styrene based strongly basic anion exchange resin (AMBERLITE IRA402BL) in place of 40 mL of the free base type styrene based weakly basic anion exchange resin (AMBERLITE IRA96SB). The results of analysis and organoleptic evaluation of the treated liquids are shown in Table 2.

TABLE 2

|  | Stock liquids of imo-shochu | Example 3 | Example 4 | Comparative Example 2 |
|---|---|---|---|---|
| Alcohol concentration (%) | 25 | 25 | 25 | 25 |
| pH | 4.79 | 6.15 | 6.20 | 6.34 |
| Electrical conductivity (μs/cm) | 20.7 | 0.5 | 0.5 | 0.5 |
| Aldehyde concentration (mg/L) | 17 | <1 | <1 | <1 |
| Ethyl acetate concentration (mg/L) | 100 | 60 | 100 | <30 |
| Fragrance | Fragrance of steamed sweet potatoes | Thin fragrance | Fragrance of steamed sweet potatoes | Odorless |
| Feel on the tongue | Stimulant | Stimulant | Non-stimulant | Non-stimulant |

(Note)
With respect to the fragrance and feel on the tongue, the organoleptic evaluation by six panels was carried out.

From the results of the present experiments, it is noted that according to Examples 1 to 4 using a free base type weakly basic anion exchange resin as the anion exchange resin for desalting, aldehydes and conductive salts can be removed likewise the conventional art (Comparative Examples 1 and 2) using an OH type strongly basic anion exchange resin as the anion exchange resin for desalting; and that the treatment can be carried out while retaining the characteristics of the stock liquids such as fragrance and feel on the tongue as compared with the conventional art (Comparative Examples 1 and 2). In addition, from the results of the present experiments, it is noted that in the case of using a free base type styrene based weakly basic anion exchange resin as the anion exchange resin for desalting (Examples 1 and 3), treated liquids which are thin in the fragrance and which are closed to the stock liquids with respect to the feel on the tongue is obtained; and that in the case of using a free base type acrylic weakly basic anion exchange resin as the anion exchange resin for desalting (Examples 2 and 4), treated liquids which are closed to the stock liquids in the fragrance and which are free from a stimulus with respect to the feel on the tongue is obtained.

The invention claimed is:
1. A method for purifying alcoholic liquors, wherein
after passing alcoholic liquors through an $HSO_3$ type strongly basic anion exchange resin layer, or after adding an $HSO_3$ salt to alcoholic liquors; the alcoholic liquors are passed through a mixed bed layer containing of an H type strongly acidic cation exchange resin and a free base type weakly basic anion exchange resin, or the alcoholic liquors are successively passed through an H type strongly acidic cation exchange resin layer and a free base type weakly basic anion exchange resin layer.
2. The method for purifying alcoholic liquors according to claim 1, wherein
the alcoholic liquors are distilled alcoholic liquors.
3. A purification apparatus of alcoholic liquors, comprising an ion exchange device for passing alcoholic liquors through an $HSO_3$ type strongly basic anion exchange resin layer, or an $HSO_3$ salt addition device for adding an $HSO_3$ salt to alcoholic liquors; and an ion exchange device for passing the alcoholic liquors through a mixed bed layer containing of an H type strongly acidic cation exchange resin and a free base type weakly basic anion exchange resin, or an ion exchange device for successively passing the alcoholic liquors through an H type strongly acidic cation exchange resin layer and a free base type weakly basic anion exchange resin layer, in this order.
4. The purification apparatus of alcoholic liquors according to claim 3, wherein
the alcoholic liquors are distilled alcoholic liquors.

* * * * *